(12) United States Patent
Barnabas et al.

(10) Patent No.: US 11,999,843 B2
(45) Date of Patent: Jun. 4, 2024

(54) POLYVINYL ALCOHOL COMPOSITIONS WITH EUTECTIC SOLVENTS, ARTICLES THEREOF, AND METHODS OF MAKING SAME

(71) Applicant: The Procter & Gamble Company, Cincinnati, OH (US)

(72) Inventors: Freddy Arthur Barnabas, West Chester, OH (US); Michaela Monika Czupik, Cincinnati, OH (US); Lori Ann Bacca, Madisonville, TN (US); Daniel Brannum, Beavercreek, OH (US)

(73) Assignee: The Procter & Gamble Company, Cincinnati, OH (US)

(*) Notice: Subject to any disclaimer, the term of this patent is extended or adjusted under 35 U.S.C. 154(b) by 316 days.

(21) Appl. No.: 17/591,647

(22) Filed: Feb. 3, 2022

(65) Prior Publication Data
US 2022/0332934 A1    Oct. 20, 2022

Related U.S. Application Data

(60) Provisional application No. 63/174,683, filed on Apr. 14, 2021.

(51) Int. Cl.
*C08L 29/04* (2006.01)
*C08J 5/18* (2006.01)

(52) U.S. Cl.
CPC .............. *C08L 29/04* (2013.01); *C08J 5/18* (2013.01); *C08J 2329/04* (2013.01)

(58) Field of Classification Search
CPC .......... C08K 5/175; C08K 5/19; C08K 5/092; C08L 29/04
See application file for complete search history.

(56) References Cited

U.S. PATENT DOCUMENTS

| | | | |
|---|---|---|---|
| 9,133,329 | B2 | 9/2015 | Denome |
| 2008/0182937 | A1 | 7/2008 | Urian et al. |
| 2009/0247432 | A1 | 10/2009 | Miller |
| 2016/0024446 | A1 | 1/2016 | Lee et al. |
| 2016/0102279 | A1 | 4/2016 | Labeque et al. |
| 2017/0055555 | A1 | 3/2017 | Skiff et al. |
| 2017/0233539 | A1 | 8/2017 | Friedrich et al. |
| 2018/0000753 | A1 | 1/2018 | Tønnesen et al. |

FOREIGN PATENT DOCUMENTS

| | | | |
|---|---|---|---|
| CN | 105219645 A | * | 1/2016 |
| CN | 112212779 A | | 1/2021 |
| WO | 2020044210 A1 | | 3/2020 |

OTHER PUBLICATIONS

PCT Search Report and Written Opinion for PCT/US2022/024555 dated Jul. 8, 2022, 13 pages.
Ganesh Degam et al. "Deep Eutectic Solvents Synthesis, Characterization and Applications in Pretreatment of Lignocellulosic Biomass"; Retrieved from internet URL; http://openprairie.sdstate.edu/etd, Year 2017, pp. 1-195.

* cited by examiner

*Primary Examiner* — Mark S Kaucher
(74) *Attorney, Agent, or Firm* — Kathleen Y. Carter; James E. Oehlenschlager

(57) ABSTRACT

Water-soluble films including a polyvinyl alcohol polymer (PVOH) and one or more eutectic solvent pairs (eutectic solvent) in predefined ratios.

13 Claims, 1 Drawing Sheet

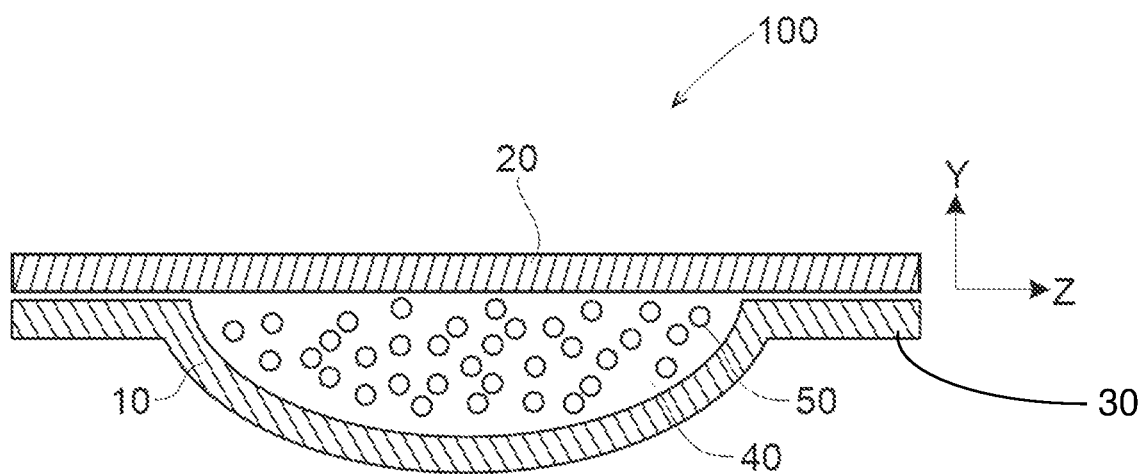

POLYVINYL ALCOHOL COMPOSITIONS WITH EUTECTIC SOLVENTS, ARTICLES THEREOF, AND METHODS OF MAKING SAME

FIELD OF THE INVENTION

The disclosure relates generally to water-soluble compositions which include a polyvinyl alcohol (PVOH) and a eutectic solvent, and which can be used for contact with liquids, solids, or combinations thereof. The disclosure further relates to methods of making articles.

BACKGROUND OF THE INVENTION

Water-soluble polymeric articles, such as containers, pellets, and films formed from polyvinyl alcohols (PVOH) are commonly used as packaging materials to simplify dispersing, pouring, dissolving and dosing of a material to be delivered. The article may contain or entrap actives that are released when the article dissolves in water. For example, packets made from water-soluble film are commonly used to package household care compositions, e.g., a pouch containing a laundry or dish detergent.

The films formed from polyvinyl alcohol (PVOH) are attracting more attention for their high transparency, barrier properties as well as their non-toxic and environment friendly character. PVOH possesses better flexibility, transparency, toughness and lower cost than most other polymeric films with barrier properties, as such they have been used as barrier films for consumer products. However, strong inter- and intra-molecular hydrogen bonding exits between polar hydroxyl groups on the backbone of PVOH, leading to poor flowability of the resulting materials. PVOH possesses a high structural regularity and crystallinity, resulting in a high melting point which is near or higher than its decomposing temperature, making the melt processing difficult. Presently, the main method for preparing PVOH films is solution casting, which results in high cost, complex technology and an unstable product quality.

Modification of PVOH compositions is needed to improve melt processing by altering the flowability and lowering the melting point. The methods mainly consist of: (1) Blending with other polymers; (2) Copolymerization modification; (3) Post-reaction structural units were incorporated to lower the structural regularity and enhance the thermal stability; and (4) Adding plasticizers with small molecular weight.

The selection of a plasticizer for a specified system is normally based on the compatibility and permanence of the plasticizer in the polymer matrix, the amount necessary for plasticization, and the desired physical properties of the composition. The use of plasticizers has shown to be rather limited, especially in film formation, as the they often do not lower the melting temperature of the PVOH enough to allow for the addition of volatile and temperature sensitive compounds, such as bittering agents and perfumes. Further the amount of plasticizer must be strictly controlled as they may cause the article formed from the composition to become brittle, difficult to process, or prone to breaking; and at elevated plasticizer levels, the articles may be too soft, weak, or difficult to process for a desired use.

What is needed is an article forming aid that lowers the melting temperature of PVOH allowing for the melt processing of the article and optionally, the addition of volatile and temperature sensitive actives.

SUMMARY OF THE INVENTION

A water-soluble composition is provided that comprises a polyvinyl alcohol (PVOH) polymer and a eutectic solvent.

A method of manufacturing a 3D article is provided that comprises the steps of heating a composition comprising a polyvinyl alcohol (PVOH) polymer and a eutectic solvent to a temperature of about 80° C. to about 170° C. and applying pressure to the composition causing it to flow.

A method of making a water-soluble film is provided that comprises providing a polyvinyl alcohol (PVOH) polymer; providing a eutectic solvent; and forming a water-soluble film comprising the eutectic solvent and PVOH polymer.

BRIEF DESCRIPTION OF THE DRAWINGS

While the specification concludes with claims particularly pointing out and distinctly claiming the subject matter that is regarded as the present disclosure, it is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

FIGURE is a side cross-sectional view of a pouch.

DETAILED DESCRIPTION OF THE INVENTION

Disclosed herein are water-soluble compositions and articles thereof, including films, that comprise a polyvinyl alcohol polymer (PVOH) and one or more eutectic solvent pairs (eutectic solvent) in predefined ratios, such as choline chloride/malic acid, lactic acid/betaine, maleic acid/choline chloride, levulinic acid/choline chloride, lactic acid/propylene glycol, 1-arginine/levulinic acid, or trehalose/choline chloride, and delivery pouches formed from or otherwise including the films. The eutectic solvent lowers the melting temperature of PVOH more than other typical plasticizers; allows better extrusion film formation because the plasticizer is not as volatile as previous known plasticizers; in extrusion allows the addition of volatile and temperature sensitive compounds, such as tittering agents and perfumes; when a film is extruded or solution cast the eutectic solvent lowers PVOH melting temperature (Tm) but maintains sufficient physical properties of the film allowing for further processing advantages, such as improved thermoforming seals that have less tendency to break.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

Articles of the present disclosure formed from the water-soluble composition may contain or entrap a composition, for example a household care composition. The composition can be selected from a liquid, solid or combination thereof. As used herein, "liquid" includes free-flowing liquids, as well as pastes, gels, foams and mousses. Non-limiting examples of liquids include light duty and heavy duty liquid detergent compositions, fabric enhancers, detergent gels commonly used for laundry, bleach and laundry additives. Gases, e.g., suspended bubbles, or solids, e.g. particles, may be included within the liquids. A "solid" as used herein includes, but is not limited to, powders, agglomerates, and mixtures thereof. Non-limiting examples of solids include: granules, micro-capsules, beads, noodles, and pearlised balls. Solid compositions may provide a technical benefit including, but not limited to, through-the-wash benefits, pre-treatment benefits, and/or aesthetic effects.

As used herein, the term "homopolymer" generally includes polymers having a single type of monomeric repeating unit (e.g., a polymeric chain consisting of or consisting essentially of a single monomeric repeating unit). For the particular case of PVOH, the term "homopolymer" (or "PVOH homopolymer" or "PVOH polymer") further includes copolymers having a distribution of vinyl alcohol monomer units and vinyl acetate monomer units, depending on the degree of hydrolysis (e.g., a polymeric chain consisting of or consisting essentially of vinyl alcohol and vinyl acetate monomer units). In the limiting case of 100% hydrolysis, a PVOH homopolymer can include a true homopolymer having only vinyl alcohol units.

As used herein, the term "copolymer" generally includes polymers having two or more types of monomeric repeating units (e.g., a polymeric chain consisting of or consisting essentially of two or more different monomeric repeating units, whether as random copolymers, block copolymers, etc.). For the particular case of PVOH, the term "copolymer" (or "PVOH copolymer") further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain consisting of or consisting essentially of vinyl alcohol monomer units, vinyl acetate monomer units, and one or more other monomer units, for example anionic monomer units). In the limiting case of 100% hydrolysis, a PVOH copolymer can include a copolymer having vinyl alcohol units and one or more other monomer units, but no vinyl acetate units.

All temperatures herein are in degrees Celsius (° C.) unless otherwise indicated. Unless otherwise specified, all measurements herein are conducted at 20° C. and under the atmospheric pressure.

In the present disclosure, all percentages are by weight of the total composition, unless specifically stated otherwise. All ratios are weight ratios, unless specifically stated otherwise.

Unless otherwise noted, all component or composition levels are in reference to the active portion of that component or composition, and are exclusive of impurities, for example, residual solvents or by-products, which may be present in commercially available sources of such components or compositions.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Polyvinyl Alcohol Polymers

The water-soluble composition includes at least one polyvinyl alcohol (PVOH) polymer, which may include homopolymers thereof (e.g., including substantially only vinyl alcohol and vinyl acetate monomer units, if any) and copolymers thereof (e.g., including one or more other monomer units in addition to vinyl alcohol and optionally vinyl acetate units). PVOH is a synthetic resin generally prepared by alcoholysis, usually termed hydrolysis or saponification, of polyvinyl acetate. One or a plurality of PVOH polymers can be selected or blended by the teachings herein with a eutectic solvent to create an article, such as a film, which is soluble in aqueous solutions. Such water-soluble films can find utility in, for example, creation of sealed pouches for delayed release of cleaning actives or rinse additives such as those found in laundry detergent compositions.

Fully hydrolyzed PVOH, wherein virtually all the acetate groups have been converted to alcohol groups, is a strongly hydrogen-bonded, highly crystalline polymer which dissolves only in hot water—greater than about 140° F. (60° C.). If a sufficient number of acetate groups are allowed to remain after the hydrolysis of polyvinyl acetate, the PVOH polymer then being known as partially hydrolyzed, it is more weakly hydrogen-bonded and less crystalline and is soluble in cold water—less than about 50° F. (10° C.). An intermediate cold or hot water soluble composition can include, for example, intermediate partially-hydrolyzed PVOH (e.g., with degrees of hydrolysis of about 94% to about 98%), and is readily soluble only in warm water—e.g., rapid dissolution at temperatures of about 40° C. and greater. Both fully and partially hydrolyzed PVOH types are commonly referred to as PVOH homopolymers although the partially hydrolyzed type can be referred to as a vinyl alcohol-vinyl acetate copolymer.

The degree of hydrolysis (DH) of the PVOH polymers included in the water-soluble compositions of the present disclosure may be in a range of about 75% to about 99% (e.g., about 79% to about 92%, about 86.5% to about 89%, or about 88%, such as for cold-water soluble compositions; about 90% to about 99%, about 92% to about 99%, or about 95% to about 99%). As the degree of hydrolysis is reduced, a film made from the resin will have reduced mechanical strength but faster solubility at temperatures below about 20° C. As the degree of hydrolysis increases, a film made from the polymer will tend to be mechanically stronger, and the thermoformability and/or dissolution, especially at colder wash temperatures, will tend to decrease.

The degree of hydrolysis of the PVOH may be chosen such that the water-solubility of the polymer is temperature dependent, and thus the solubility of a film made from the polymer, any compatibilizer polymer, and additional ingredients is also influenced. The film may be cold water-soluble. A cold water-soluble film, soluble in water at a temperature of less than 10° C., can include PVOH with a degree of hydrolysis in a range of about 75% to about 90%, or in a range of about 80% to about 90%, or in a range of about 85% to about 90%. The film may also be hot water-soluble. A hot water-soluble film, soluble in water at a temperature of at least about 60° C., can include PVOH with a degree of hydrolysis of at least about 98%.

The water-soluble polymers (e.g., the PVOH resin blend alone or in combination with other water-soluble polymers) can be included in the composition in an amount in a range of from about 50 wt. %, or about 60 wt. %, about 70 wt. %, or about 75 wt. %, and/or to about 80 wt. %, or about 85 wt. %, or about 90 wt. %, or about 95 wt. %. For example, the PVOH resin blend may be present in the water-soluble film in an amount in a range of about 50 wt. %, or about 65 wt. %, about 70 wt. %, about 75 wt. %, and/or to about 80 wt. %, or about 85 wt. %, or about 90 wt. %, or about 95 wt. %, by weight of the composition.

The water-soluble composition may contain at least about 50 wt. %, 55 wt. %, 60 wt. %, 65 wt. %, 70 wt. %, 75 wt. %, 80 wt. %, 85 wt. %, or 90 wt. % and/or up to about 60 wt. %, 70 wt. %, 80 wt. %, 90 wt. %, 95 wt. %, or 99 wt. % of the PVOH polymer or PVOH polymer blend. Preferably the polymer blend is present in the composition from about 75% to about 99%, more preferably from about 70% to about 95%.

As described in more detail below, the PVOH polymers may be characterized in terms of their viscosities (the values of which generally correlate to the molecular weights of the polymers). The viscosity of a polymer is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. Polymeric viscosities specified herein in centipoise (cP) should be understood to refer to the viscosity of a 4% aqueous water-soluble polymer solution at 20° C., unless specified otherwise.

The PVOH polymer may be characterized by a 4% solution viscosity at 20° C. ($\mu$) of from about 10 cP to about 40 cP, or from about 10 cP to about 30 cP, or from about 12 cP to about 25 cP, or from about 14 cP to about 20 cP. The viscosity $\mu$ may be in a range of about 4 cP to about 24 cP (e.g., at least about 4, 8, 10 or 12 cP and/or up to about 12, 16, 20, or 24 cP, such as about 10 cP to about 16 cP or about 10 cP to about 20 cP).

It is well known in the art that the viscosity of a PVOH polymer and copolymer is correlated with the weight-average molecular weight (Mw) of the same polymer, and often the viscosity is used as a proxy for (Mw). Thus, the weight-average molecular weight of the PVOH polymer or copolymer, can be in a range of about 30,000 to about 175,000 g/mol, or about 30,000 to about 100,000 g/mol, or about 55,000 to about 85,000 g/mol, for example.

As described above, PVOH polymers may be characterized by a degree of hydrolysis. The PVOH polymer may be characterized by a degree of hydrolysis of about 60% to about 99%, preferably from about 80% to about 98%, preferably from about 85% to about 95%, preferably from about 87% to about 92%.

The water-soluble composition may be in the form of a film and have a residue value of about 48 wt. % or less as measured by the Dissolution Chamber Test. The water-soluble film may have an average tensile strength value of at least about 33 MPa as measured by the Tensile Strength Test. The water-soluble film may have a modulus value of at least about 12 N/mm$^2$ as measured by the Modulus Test. The test methods for each are provided herein.

The compositions described herein may comprise a first PVOH polymer or more than one PVOH polymer, such as a first and a second PVOH polymer. The particular chemistries of the first and second PVOH polymers are described in more detail below.

a. First PVOH Polymer

Compositions described herein may include a first PVOH polymer. The first PVOH polymer may include a first anionic monomer unit. The first PVOH polymer may be a PVOH terpolymer including vinyl alcohol monomer units, vinyl acetate monomer units (i.e., when not completely hydrolyzed), and a single type of anionic monomer unit (e.g., a where a single type of monomer unit can include equivalent acid forms, salt forms, and optionally residual ester forms of the anionic monomer unit). The PVOH copolymer can include two or more types of anionic monomer units.

The first anionic monomeric unit may be derived from a member of the group consisting of vinyl acetic acid, maleic acid, monoalkyl maleate, dialkyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, salts of the forgoing, preferably alkali metal salts of the foregoing, esters of the foregoing, and combinations thereof.

The anionic monomer unit in the first PVOH polymer may be a carboxylated anionic monomer unit. As used herein, a "carboxylated anionic monomer unit" includes the vinyl polymerization units corresponding to monocarboxylic acid vinyl monomers, their esters and anhydrides, dicarboxylic monomers having a polymerizable double bond, their esters and anhydrides, and salts, preferably alkali metal salts, of any of the foregoing.

Examples of suitable carboxylated anionic monomer units include the vinyl polymerization units corresponding to vinyl anionic monomers including vinyl acetic acid, maleic acid, monoalkyl maleate, dialkyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations thereof (e.g., multiple types of anionic monomers or equivalent forms of the same anionic monomer). The carboxylated anionic monomer unit may be derived from maleic acid, monoalkyl maleate, dialkyl maleate, maleic anhydride, and combinations thereof. The carboxylated anionic monomer unit may be derived from a monoalkyl maleate monomer unit. The monoalkyl maleate monomer unit may be derived from a member of the group consisting of monomethyl maleate, alkali metals salts thereof (e.g., sodium salts), and combinations thereof.

The one or more anionic monomer units may be incorporated or present in the first PVOH polymer at a given amount. Typically, as anionic monomer content increases, so does solubility of the PVOH polymer resin, resin blends, and/or films made from such resins or resin blends. Films that include PVOH polymers having higher anionic monomer contents also may have relatively greater tackiness, which may be indicative of greater sealability. However, a water soluble film where the relative tackiness is too high may not be desired due to challenges converting tacky films into pouches.

The amount of anionic monomer units may be characterized in terms of the molar content (expressed, e.g., as mol. %) of the anionic monomer units in a PVOH polymer. The one or more anionic monomer units may be present in the first PVOH polymer in an amount in a range of from about 1 mol. % to about 5 mol. %, or from about 2 mol. % to about 4 mol. %, or from about 2 mol. % to about 5 mol. %, or from about 3 mol. % to about 5 mol. %, or from about 3.5 mol. % to about 4.5 mol. %, or from about 4 mol. % to about 4.5 mol. %, individually or collectively. The one or more anionic monomer units may be present in the first PVOH polymer in an amount in a range of from about 1 mol. % to about 4 mol. %, or from about 1 mol. % to about 3 mol. %. The anionic monomer unit(s) may be present in the first PVOH polymer in an amount of at least about 1.0, 1.5, 2.0, 2.5, 3.0, 3.5, of 4.0 mol. %, and/or up to about 6.0, 5.5, 5.0, 4.5, 4.0, 3.5, 3.0, or 2.5 mol. %.

Alternatively or additionally, the anionic monomer unit(s) may be characterized in terms of the anionic monomer units present in a PVOH film, for example as molar content (mol. %) of the anionic monomer units compared to the total amount of PVOH polymer in the film (e.g., total of PVOH polymer, including homopolymer(s) and copolymer(s), in the PVOH resin blend). The anionic monomer unit(s) may be present in the water-soluble film in an amount in the range of from about 0.5 mol. % to about 5 mol. % of total PVOH polymer in the film. The anionic monomer unit(s) may be present in the film in an amount of at least about 0.5, 0.75, 1.0, or 1.2 mol. %, and/or up to about 5.0, 4.5, 4.0, 3.0, 2.5, 2.0, or 1.7 mol. %, of total PVOH polymer in the film. For example, a first PVOH polymer that includes (carboxylated) anionic monomer units may be blended with a second PVOH polymer, such as a homopolymer, in about a 30 wt %/70 wt % blend to about a 70 wt %/30 wt % blend to achieve an average blend anionic monomer unit content of from about 0.5 mol. % to about 3 mol. % of total PVOH polymer. The foregoing anionic monomer unit content alternatively or additionally may also apply relative to total water-soluble polymer content in film, PVOH or otherwise.

The first PVOH polymer may be present in an amount in a range of about 10 wt. % to about 100 wt. % of total PVOH polymers in the composition or about 10 wt. % to about 90 wt. % of total PVOH polymers.

b. Second PVOH Polymer

The compositions described herein may include a second PVOH polymer. The second PVOH polymer is selected from a PVOH polymer that includes (a) a second anionic monomeric unit, a vinyl alcohol monomer unit and optionally a vinyl acetate unit, or (b) a PVOH homopolymer consisting of a vinyl alcohol monomer unit and optionally a vinyl acetate unit.

The second PVOH polymer may be a PVOH polymer that includes a second anionic monomeric unit. The second anionic unit may be different than the first anionic monomeric unit, or they may be the same. When the first and second anionic monomeric units are the same, the first and second PVOH polymers are different in some way, for example in terms of respective viscosities or in terms of the respective level of incorporation of the anionic monomeric units.

The second anionic monomeric unit may be selected from the group consisting of vinyl acetic acid, maleic acid, monoalkyl maleate, dialkyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing, esters of the foregoing, and combinations thereof. The second anionic monomeric unit may be selected from the group consisting of acrylamido methylpropanesulfonic acids, alkali metal salts thereof, and combinations thereof. The first anionic monomeric unit in the first PVOH polymer may be selected from the group consisting of monomethyl maleate, alkali metal salts thereof, and combinations thereof, and the second monomeric unit in the second PVOH polymer may be selected from the group consisting of acrylamido methylpropanesulfonic acids, alkali metal salts thereof, and combinations thereof. The first PVOH polymer may be present in the composition in a range of from about 50 wt. % to about 100 wt. %, preferably from about 70 wt. % to about 90 wt. %, by weight of the total PVOH polymers in the composition, wherein the first anionic monomeric unit is derived from a member selected from the group consisting of monomethyl maleate, alkali metal salts thereof, and combinations thereof, wherein the second PVOH polymer is present in the composition in a range of from about 10 wt. % to about 50 wt. %, preferably from about 10 wt. % to about 30 wt. %, by weight of the total PVOH polymers in the composition, and wherein the second monomeric unit is derived from a member selected from the group consisting of acrylamido methylpropanesulfonic acids, alkali metal salts thereof, and combinations thereof.

The second anionic monomer unit may be present in the second PVOH polymer in an amount in a range of about 1.0 mol. % to about 5.0 mol. % of the second PVOH polymer. The second anionic monomer unit is present in the film in an amount in a range of about 0.2 mol. % to about 5.0 mol. %, or from about 0.5 mol. % to about 4.5 mol. %, or from about 1 mol. % to about 3 mol. %, of total PVOH polymers in the film.

The first PVOH polymer may have a first level of incorporation ($a_1$) of the first anionic monomer unit, and the second PVOH polymer may have a second level of incorporation ($a_2$) of the second anionic monomer unit. When the first and second anionic monomer units are the same, the absolute value of $|a_1-a_2|$ may be greater than zero. The value of $(a_1-a_2)$ may be greater than zero. It may be that $a_1$ is in a range of about 1 mol. % to about 5 mol. %, preferably from about 1 mol. % to about 3 mol. % of the first PVOH polymer, $a_2$ is in a range of about 1 mol. % to about 5 mol. %, preferably from about 1 mol. % to about 3 mol. % of the second PVOH polymer, and $|a_1-a_2|$, preferably $a_1-a_2$, is in a range of about 0 mo. % to about 3 mol. %, or from about 1 mol. % to about 3 mol. %.

The first anionic monomer unit and the second anionic monomer unit may be together present in a combined amount in a range of about 2.0 mol. % to about 3.5 mol. % of total PVOH polymers in the film.

The second PVOH polymer may be a PVOH homopolymer comprising vinyl alcohol monomer units and optionally vinyl acetate monomer units.

The second PVOH polymer may be characterized by a 4% solution viscosity at 20° C. ($\mu_2$) from about 3.0 cP to about 40 cP, or from about 7 cP to about 40 cP, or from about 10 cP to about 40 cP, or from about 10 cP to about 30 cP, or from about 12 cP to about 25 cP. The first PVOH polymer may be characterized by a first 4% solution viscosity at 20° C. ($\mu_1$), the second PVOH polymer may be characterized by a second 4% solution viscosity at 20° C. ($\mu_2$), and an absolute viscosity difference $|\mu_2-\mu_1|$ for the first PVOH polymer and the second PVOH polymer may be in a range of 0 cP to about 10 cP, preferably of from 2 cP to 8 cP.

The second PVOH polymer may be characterized by a degree of hydrolysis of from about 60% to about 99%, preferably from about 80% to about 98%, preferably from about 83% to about 95%, preferably from about 85% to about 92%.

The second PVOH polymer may be present in an amount in a range of about 10 wt. % to about 90 wt. %, preferably 30 wt % to 80 wt %, more preferably 50 wt % to 70 wt % of total PVOH polymers in the film.

The first PVOH polymer may be present in the composition in a range of from about 20 wt. % to about 60 wt. %, preferably from about 30 wt. % to about 40 wt. %, by weight of the total PVOH polymers in the blend, wherein the first anionic monomeric unit of the first PVOH polymer is derived from a member selected from the group consisting of monomethyl maleate, alkali metal salts thereof, and combinations thereof, and wherein the second PVOH polymer is a PVOH homopolymer that is characterized by a 4% solution viscosity at 20° C. ($\mu_2$) from about 10 cP to about 30 cP and is present in the PVOH resin blend in a range of from about 40 wt. % to about 80 wt. %, preferably from about 60 wt. % to about 70 wt. %, by weight of the total PVOH polymers in the blend.

Eutectic Solvents

The compositions of the present invention may comprise between 1 to 25 weight % of a eutectic solvent, or from about 2 to about 22 weight %, or from about 5 to about 20 weight % of a eutectic solvent. A eutectic solvent is a mixture of at least one hydrogen bond acceptor (HBA) and at least one hydrogen bond donor (HBD). The melting temperature of the eutectic solvent may be lower than the melting temperature of the HBA and lower than the melting temperature of the HBD.

Examples of hydrogen bond acceptors include, but are not limited to; amino acids such as arginine, proline, alanine, phenylalanine, glutamine, lysine, glycine, and betaine; polyols that are not sugar alcohols such as glycerin and propylene glycol; and amines such as amine oxides, pyridine, pyrrole and salts, preferably halide salts, of quaternary ammonium compounds such as choline, 1-ethyl-3-methylimidazolium, and betaine.

The HBA may be a small molecule comprising from about 3 to about 16 carbon atoms, or from about 4 to about 12 carbon atoms, or from about 5 to about 8 carbon atoms.

In certain embodiments, the HBA is choline chloride and may be at least about 7.5%, at least about 10%, at least about 15%, at least about 20%, at least about 25, at least about 30%, at least about 35%, at least about 40%, at least about 50%, at least about 55%, at least about 60%, at least about 65%, at least about 70%, at least about 75% by weight, at least about 80%, at least about 85%, or at least about 90% by weight of the eutectic solvent.

Examples of hydrogen bond donors include, but are not limited to, carboxylic acids that do not contain quaternary amines such as maleic acid, malic acid, lactic acid, fumaric acid, acetic acid, ascorbic acid, levulinic acid, salicylic acid, benzoic acid, oxalic acid, malonic acid, succinic acid, glutaric acid, adipic acid, tartaric acid, and citric acid, and salts thereof; sugars such as sucrose, xylose, trehalose, glucose, and fructose; sugar alcohols such as sorbitol, erythritol, xylitol, and mannitol; and amides such as urea, N-methylurea, dimethylurea, and caprolactam. The HBD may be a small molecule that comprises from about 1 to about 12 carbon atoms, or from about 2 to about 10 carbon atoms, or from about 3 to about 8 carbon atoms.

The amount of hydrogen bond donor may be at least about 1%, at least about 5%, at least about 10%, at least about 15%, at least about 20%, at least about 25%, at least about 30%, at least about 35%, at least about 40%, at least about 50%, at least about 55%, at least about 60%, at least about 65%, at least about 70%, or at least about 75% by weight of the eutectic solvent.

The molar ratio of HBD to HBA for a eutectic solvent may be about 10:1, 9:1, 8:1, 7:1, 6:1, 5:1, 9:2, 4:1, 7:2, 3:1, 5:2, 2:1, 3:2, 1:1, 2:3, 1:2, 2:5, 1:3, 2:7, 1:4, 2:9, 1:5, 1:6, 1:7, 1:8, 1:9, or 1:10. The molar ratio of HBD to HBA may range from about 10:1 to about 1:10, or from about 5:1 to 1:5, from about 2:1 to 1:3, or be about 1:1. The eutectic solvent may be liquid at 25° C. Examples of eutectic solvents are described in Table 1 and may be found in Deep Eutectic Solvents by Yizhak Marcus published in 2019 by Springer.

TABLE 1

Examples of eutectic solvents

| Hydrogen Bond Donor | Hydrogen Bond Acceptor | HBD:HBA Molar Ratio |
| --- | --- | --- |
| Maleic acid | Choline chloride | 1:1 |
| Maleic acid | Choline chloride | 1:2 |
| Maleic acid | Choline chloride | 1:3 |
| Maleic acid | Choline chloride | 1:4 |
| Maleic acid | Choline chloride | 1:5 |
| Malic acid | Choline chloride | 1:1 |
| Malic acid | Choline chloride | 1:2 |
| Malic acid | Choline chloride | 1:3 |
| Lactic acid | betaine | 1:1 |
| Levulinic acid | Choline chloride | 1:1 |
| Levulinic acid | Choline chloride | 1:2 |
| Sucrose | betaine | 1:2 |
| Sucrose | betaine | 1:4 |
| Trehalose | betaine | 1:4 |
| Citric acid | betaine | 1:1 |
| trehalose | Choline chloride | 1:3 |
| Citric acid | Choline chloride | 1:2 |
| Xylitol | Choline chloride | 1:3 |
| Urea | Choline chloride | 1:2 |
| Propylene glycol | Choline chloride | 1:1 |
| Glycerol | Choline chloride | 1:2 |
| Xylitol | Choline chloride | 1:3 |

The eutectic solvents of the present invention may be prepared by any method known in the art, but for purposes of illustration liquid and melt preparations are described here. For liquid preparation, the HBA(s) and HBD(s) are weighed and added to a liquid, typically distilled water and mixed until dissolved. After solubilization, the mixture is placed on a rototvap to evaporate off the liquid and form the eutectic solvent. For melt preparation, the HBA(s) and HBD(s) are weighed, combined, heated to a temperature exceeding the melting temperatures of the HBA(s) and HBD(s), and then cooled to form the eutectic solvent.

Benefit Agents

The composition may further comprise from about 0.01 to about 45 wt. % or from about 0.1 to about 35 wt. %, or from about 0.5 to about 25 wt. % of one or more benefit agents. The benefit agents may be entrapped in the composition allowing for easy transport but be released upon dissolving the composition is water. Examples of suitable benefit agents include: perfumes, pro-perfumes, finishing aids, malodor control and removal agents, odor neutralizers, polymeric dye transfer inhibiting agents, cationic deposition enhancing polymers, builders, heavy metal ion sequestrants, surfactants, suds stabilizing polymers, pH modifiers, buffering agents, alkalinity sources, fabric softeners, antistatic agents, dye fixatives, dye abrasion inhibitors, wrinkle reduction agents, wrinkle resistance agents, wrinkle release agents, silicones (e.g., silicone oils, cationic silicones, silicone gums, high refractive silicones, and silicone resins), soil release polymers, soil capture polymers, flocculating polymers, soil repellency agents, colorants, pigments, adversive agents such as bittering agents, anti-redeposition agents, bleach activators, bleach catalysts, bleach boosters, bleaches, photobleaches, enzymes, coenzymes, enzyme stabilizers, crystal growth inhibitors, anti-tarnishing agents, anti-oxidants, metal ion salts, corrosion inhibitors, antiperspirant, zinc pyrithione, plant derivatives, plant extracts, plant tissue extracts, plant seed extracts, plant oils, botanicals, botanical extracts, essential oils, skin sensates, astringents, etc. (e.g., clove oil, menthol, camphor, eucalyptus oil, eugenol, menthyl lactate, witch hazel distillate), anti-acne agents (salicylic acid), anti-dandruff agents, antifoaming agents, cosmetic astringents, cosmetic biocides, denaturants, drug astringents, external analgesics, film formers or materials, e.g., polymers, for aiding the film-forming properties and substantivity of the composition (e.g., copolymer of eicosene and vinyl pyrrolidone), skin bleaching and lightening agents, (e.g., hydroquinone, kojic acid, ascorbic acid, magnesium ascorbyl phosphate, ascorbyl glucoside, pyridoxine), skin-conditioning agents (e.g., humectants and occlusive agents), skin soothing and/or healing agents and derivatives (e.g., panthenol, and derivatives such as ethyl panthenol, aloe vera, pantothenic acid and its derivatives, allantoin, bisabolol, and dipotassium glycyrrhizinate), skin treating agents (e.g., vitamin D compounds, mono-, di-, and tri-terpenoids, beta-ionol, cedrol), sunscreen agents, insect repellants, oral care actives, personal health care actives, vitamins, anti-bacterial agents, anti-microbial agents, anti-fungal agents, their derivatives, and mixtures thereof.

In embodiments, the benefit agent may be at least partially surrounded with a wall material to create a microcapsule. In one aspect, the microcapsule wall material may comprise: melamine, polyacrylamide, silicones, silica, polystyrene, polyurea, polyurethanes, polyacrylate based materials, gelatin, styrene malic anhydride, polyamides, and mixtures thereof. In one aspect, said melamine wall material may comprise melamine crosslinked with formaldehyde, melamine-dimethoxyethanol crosslinked with formaldehyde, and mixtures thereof. In one aspect, said polystyrene wall material may comprise polyestyrene cross-linked with divinylbenzene. In one aspect, said polyurea wall material may comprise urea crosslinked with formaldehyde, urea crosslinked with gluteraldehyde, and mixtures thereof. In one aspect, said polyacrylate based materials may comprise polyacrylate formed from methylmethacrylate/dimethylaminomethyl methacrylate, polyacrylate formed from amine acrylate and/or methacrylate and strong acid, polyacrylate formed from carboxylic acid acrylate and/or methacrylate monomer and strong base, polyacrylate formed from an amine acrylate and/or methacrylate monomer and a carboxylic acid acrylate and/or carboxylic acid methacrylate monomer, and mixtures thereof. In one aspect, the perfume microcapsule may be coated with a deposition aid, a cationic polymer, a non-ionic polymer, an anionic polymer, or mixtures thereof. Suitable polymers may be selected from the group consisting of: polyvinylformaldehyde, partially hydroxylated polyvinylformaldehyde, polyvinylamine, polyethyleneimine, ethoxylated polyethyleneimine, polyvinylalcohol, polyacrylates, and combinations thereof. In one aspect, one or more types of microcapsules, for example two microcapsules types having different benefit agents may be used.

In embodiments, the benefit agent may be a perfume oil and may include materials selected from the group consisting of 3-(4-t-butylphenyl)-2-methyl propanal, 3-(4-t-butylphenyl)-propanal, 3-(4-isopropylphenyl)-2-methylpropanal, 3-(3,4-methylenedioxyphenyl)-2-methylpropanal, and 2,6-dimethyl-5-heptenal, alpha-damascone, beta-damascone, delta-damascone, beta-damascenone, 6,7-dihydro-1,1,2,3,3-pentamethyl-4(5H)-indanone, methyl-7,3-dihydro-2H-1,5-benzodioxepine-3-one, 2-[2-(4-methyl-3-cyclohexenyl-1-yl)propyl]cyclopentan-2-one, 2-sec-butylcyclohexanone, and beta-dihydro ionone, linalool, ethyllinalool, tetrahydrolinalool, and dihydromyrcenol. Suitable perfume materials can be obtained from Givaudan Corp. of Mount Olive, N.J., USA, International Flavors & Fragrances Corp. of South Brunswick, N.J., USA, or Quest Corp. of Naarden, Netherlands. In one aspect, the benefit agent is a perfume microcapsule. Perfumes are often volatile and may evaporate or cause combustion hazards during melt processing of PVOH. The lower melt and processing temperature of the PVOH eutectic composition may help incorporate perfume.

In embodiments, the benefit agent may be encapsulated in a shell. In one embodiment, the encapsulated benefit agent is perfume oil and the shell is a polymer.

In embodiments, the benefit agent may be an enzyme. Enzymes are often temperature sensitive and may deactivate or decompose when melt processed with PVOH. The lower melting temperature of the PVOH eutectic composition may allow for incorporate of the enzyme while minimizing the denaturing or decomposition. Suitable enzymes include proteases, amylases, cellulases, lipases, xyloguncanases, pectate lyases, mannanases, bleaching enzymes, cutinases, and mixtures thereof.

In embodiments, the benefit agent may be a flavor or a bittering or aversive agent. Flavors may be included to encourage human consumption of the composition. This is particularly useful for health care and oral care compositions. Bittering and aversive agents may be incorporated into the composition to discourage animal, in particular human, consumption. Flavors and bittering agents may decompose at elevated temperatures making it difficult to incorporate into PVOH compositions. The lower melting and processing temperature of the PVOH eutectic compositions of the present invention allow for incorporation of flavor or bittering or aversive agents while maintaining their efficacy.

In embodiments, the benefit agent may be a silicone. Useful silicones can be any silicone comprising compound. In one embodiment, the silicone polymer is selected from the group consisting of cyclic silicones, polydimethylsiloxanes, aminosilicones, cationic silicones, silicone polyethers, silicone resins, silicone urethanes, and mixtures thereof. In one embodiment, the silicone is a polydialkylsilicone, alternatively a polydimethyl silicone (polydimethyl siloxane or "PDMS"), or a derivative thereof. In another embodiment, the silicone is chosen from an aminofunctional silicone, amino-polyether silicone, alkyloxylated silicone, cationic silicone, ethoxylated silicone, propoxylated silicone, ethoxylated/propoxylated silicone, quaternary silicone, or combinations thereof.

In embodiments, the benefit agent may be an oral care active. Suitable oral care actives include prevention agents including, but not limited to: sodium fluoride, stannous fluoride, sodium monofluorophosphate; dentinal hypersensitivity treatments including, but not limited to: potassium nitrate, strontium chloride and stannous fluoride; gingivitis prevention and treatment agents, including, but not limited to stannous fluoride, triclosan, cetyl pyridinium chloride and chlorhexidine; dental erosion prevention agents including, but not limited to: sodium fluoride, stannous fluoride and sodium polyphosphate; periodontitis treatment agents including, but not limited to chlorhexidine, tetracycline, doxycycline, and ketoprofen; dry mouth amelioration agents including, but not limited to pilocarpine, pellitorin.

In embodiments, the benefit agent may be a personal health care active. Suitable personal health care actives include Personal Health care: cold and flu treatments including, but not limited to, Anti histamines, such as diphenhydramine hydrochloride, Doxylamine succinate, Chlorpheneramine Maleate, fexofenadine, terfenadine, cetirizine decongestants; such as phehylephrine hydrochloride, pseudoephedrine, oxymetazoline, expectorants, such as guiafenesin, cough suppressants; such as dextromethorpand hydrobromide, antipyretics and analgesics, such as acetaminophen, ibuprofen, naproxen, aspirin. Antacids including but not limited to acid reducers such as, magnesium hydroxide, aluminum hydroxide, calcium carbonate, sodium bicarbonate, simethicone; H2 antagonist, such as, cimetidine, ranitidine, famotidine; proton pump inhibitors, such as omeprazole, pantoprazole. Antidiarrheals including but not limited to bismuth subsalicylate, loperamide. probiotics including but not limited to *Bifidobacterium infantis, Lactobacillus acidophilus*. Bulk forming fibers including but not limited to *Psyllium*.

In embodiments, the benefit agent may be a temperature sensitive benefit agent. Temperature sensitive benefit agents are benefit agents that present challenges to processing at the temperatures associated with melt processing of PVOH compositions. Temperature sensitive benefit agents may have high vapor pressures causing them to volatilize during processing and/or thermal degradation temperatures close to the PVOH composition processing temperature. Examples of temperature sensitive benefit agents include enzymes, proteins, perfumes, flavorants and hueing dyes. An example of a temperature sensitive benefit agent is the flavorant bittering agent denatonium benzoate commercially available as BITREX®. It may be added to compositions as a deterrent to accidental ingestion by animals. Denatonium benzoate has a thermal decomposition temperature of about 180° C. Temperature sensitive benefit agents may be characterized as substances with a thermal degradation temperature less than 200° C., or from about 100° C. to about 190° C., or from about 110° C. to about 185° C., or from about 120° C. to about 180° C.

3D Articles of the Present Invention and Methods of Making Same

Compositions of the present invention may be suitable for melt flow processing into 3D articles. Examples of suitable melt flow processing include, but are not limited to, injection molding, blow molding, filament extrusion and, optionally, pelletization, film extrusion, melt spinning of fibers and/or nonwoven substrates, 3D printing, rotoforming, and prilling. The eutectic helps reduce the melt and processing temperature of the composition to enable melt flow processing at temperatures that are lower than PVOH alone. Compositions of the present invention may be melt processed by heating the composition to a temperature from about 80° C. to about 185° C., or from about 85° C. to about 160° C., or from about 90° C. to about 150° C., to soften or melt the composition and applying pressure to the composition causing it to flow.

In embodiments the three-dimensional article may be a consumer good. Examples of consumer goods include, baby care, beauty care, fabric care, home care, family care, feminine care, health care, products or devices intended to be used or consumed in the form in which it is sold, and is not intended for subsequent commercial manufacture or modification. Such products include but are not limited to fabric softener, fabric enhancer, laundry additive, conditioners, hair colorants, body wash, shampoo, facial wash, dish detergent, and heavy duty laundry detergent products for and/or methods relating to treating hair (human, dog, and/or cat), including bleaching, coloring, dyeing, conditioning, shampooing, styling; personal cleansing; cosmetics; skin care including application of creams, lotions, and other topically applied products for consumer use; and shaving products, products for and/or methods relating to treating fabrics, hard surfaces and any other surfaces in the area of fabric or home care, including: air care, car care, dishwashing, fabric conditioning (including softening), laundry detergency, laundry rinse additives and/or care, hard surface cleaning and/or treatments; products and/or methods relating to oral care including toothpastes, tooth gels, tooth rinses, denture adhesives, tooth whitening; over-the-counter health care including cough and cold remedies, pain relievers, pet health and nutrition, and water purification.

In embodiments, the three dimensional object comprises a container filled with one or more benefit agents. The container may be comprised at least partially from the composition of the present invention to provide water solubility to at least a portion of the container to release the benefit agent. The benefit agent may comprise a single solid element, a collection of solid powder elements, a liquid or a gas.

In an example, a PVOH eutectic composition is created and extruded using a Thermo Fischer Scientific Pharma 11HME fitted with a length to diameter ratio 40:1, an 11 mm twin screw operating at 200 revolutions per minute, a single hole circular die, and eight heating zones. The first heating zone is turned off and the temperature of zones two through eight is increased evenly with zone two heated to 80° C. and zone eight heated to 120° C. The die temperature is maintained at 110° C. The PVOH polymer was a dry powder of SELVOL™ POLYVINYL ALCOHOL 205 sold by Sekisui Specialty Chemicals LLC, Dallas, TX with a reported hydrolysis of 88 mol. %, a 4 wt. % solution viscosity of 5.7 cPs, a weight average molecular weight of approximately 50,000 g/mol, and a melting temperature from about 180° C. to about 190° C. The eutectic solvent was a 1:1 molar ratio of L-arginine:levulinic acid. The PVOH powder and eutectic liquid were combined in the extruder to create a composition of 74 wt. % PVOH and 26 wt. % eutectic solvent and extruded through a 3 mm die.

In an example, a composition of PVOH, eutectic, and the temperature sensitive benefit agent BITRIX® is created and extruded using a Thermo Fischer Scientific Pharma 11HME fitted with a length to diameter ratio 40:1, an 11 mm twin screw operating at 200 revolutions per minute, a single hole circular die, and eight heating zones. The set temperatures of the eight heating zones from hopper to die are 80° C., 105° C., 120° C., 120° C., 120° C., 115° C., 110° C., and 110° C. The composition comprises 74 wt. % of SELVOL™ POLYVINYL ALCOHOL 205 sold by Sekisui Specialty Chemicals LLC, Dallas, TX with a reported hydrolysis of 88 mol. %, a 4 wt. % solution viscosity of 5.7 cPs, a weight average molecular weight of approximately 50,000 g/mol, and a melting temperature from about 180° C. to about 190° C. It also comprise 25.6 wt. % of a eutectic solvent comprising a 1:1 molar ratio of L-arginine:levulinic acid and 0.4 wt. % of BITREX® commercially available from TCI America. The PVOH powder, eutectic liquid, and BITREX® were combined in the extruder and extruded through a 3 mm die. The presence and lack of degradation of BITREX® in the extruded product was confirmed using mass spectrometry.

Water-Soluble Films

In embodiments, the 3D article may be a water-soluble film. The water-soluble film may at least partially or completely enclose a household care composition in a compartment. The films described herein include PVOH homopolymers, PVOH copolymers, and PVOH resin blends. The PVOH resin blend includes at least a first PVOH polymer and a second PVOH polymer, as described in more detail below.

Other Film Components/Properties

In addition to the polyvinyl alcohol polymers described above, the water-soluble films of the present disclosure may include other components.

The films of the present disclosure may include other water-soluble polymers. Other water soluble polymers for use in addition to the PVOH polymers and PVOH copolymers in the blend can include, but are not limited to modified polyvinyl alcohols, polyacrylates, water-soluble acrylate copolymers, polyvinyl pyrrolidone, polyethyleneimine, pullulan, water-soluble natural polymers including, but not limited to, guar gum, gum Acacia, xanthan gum, carrageenan, and starch, water-soluble polymer derivatives including, but not limited to, modified starches, ethoxylated starch, and hydroxypropylated starch, copolymers of the forgoing and combinations of any of the foregoing. Yet other water-soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, and polymethacrylates. Such water-soluble polymers, whether PVOH or otherwise are commercially available from a variety of sources. Any of the foregoing water-soluble polymers are generally suitable for use as film-forming polymers. In general, the water-soluble film can include copolymers and/or blends of the foregoing resins.

Water-soluble polymers for use in the film described herein (including, but not limited to PVOH polymers and PVOH copolymers) can be characterized by a viscosity in a range of about 3.0 to about 27.0 cP, about 4.0 to about 24.0 cP, about 4.0 to about 23.0 cP, about 4.0 cP to about 15 cP, or about 6.0 to about 10.0 cP, for example. The viscosity of a polymer is determined by measuring a freshly made solution using a Brookfield LV type viscometer with UL adapter as described in British Standard EN ISO 15023-2: 2006 Annex E Brookfield Test method. It is international practice to state the viscosity of 4% aqueous polyvinyl alcohol solutions at 20° C. Polymeric viscosities specified herein in cP should be understood to refer to the viscosity of a 4% aqueous water-soluble polymer solution at 20° C., unless specified otherwise.

It is well known in the art that the viscosity of a water-soluble polymer (PVOH or otherwise) is correlated with the weight-average molecular weight ($\overline{M}w$) of the same polymer, and often the viscosity is used as a proxy for $\overline{M}w$. Thus, the weight-average molecular weight of the water-soluble polymers, including the first PVOH copolymer and second PVOH polymer, can be in a range of about 30,000 to about 175,000, or about 30,000 to about 100,000, or about 55,000 to about 85,000, for example.

The water-soluble film can contain other auxiliary agents and processing agents, such as, but not limited to surfactants, lubricants, release agents, fillers, extenders, cross-linking agents, antiblocking agents, antioxidants, detackifying agents, antifoams, nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. Films that include plasticizers are beneficial. The amount of such agents can be up to about 50 wt. %, 20 wt %, 15 wt %, 10 wt %, 5 wt. %, 4 wt % and/or at least 0.01 wt. %, 0.1 wt %, 1 wt %, or 5 wt %, individually or collectively. Preferably the total amount of such auxiliary agents and processing aids in the film is from about 20% to about 50%, more preferably from about 25% to about 40%.

The water-soluble film may be substantially free of traditional plasticizers such as glycerin, diglycerin, sorbitol, ethylene glycol, diethylene glycol, triethylene glycol, dipropylene glycol, tetraethylene glycol, propylene glycol, polyethylene glycols up to 400 MW, neopentyl glycol, trimethylolpropane, polyether polyols, sorbitol, 2-methyl-1,3-propanediol, ethanolamines, and a mixture thereof. The total amount of the traditional plasticizer may be less than about 1%, or less than about 0.1%, or less than about 0.01%, or even 0%, based on total film weight.

Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof. The amount of surfactant in the water-soluble film may be in a range of about 0.1 wt % to 2.5 wt %, optionally about 1.0 wt % to 2.0 wt %.

Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. The amount of lubricant/release agent in the water-soluble film may be in a range of about 0.02 wt % to about 1.5 wt %, optionally about 0.1 wt % to about 1 wt %.

The film may include an aversive agent, such as a bittering agent, e.g., denatonium benzoate and/or a derivative thereof. The aversive agent may be mixed with the polymeric material and/or other adjuncts prior to making the film (e.g., prior to casting or extruding the film). Alternatively or additionally, the aversive agent may be added to the film or to the pouch once formed, for example, added by dusting, printing, spraying, or otherwise coating.

Suitable fillers/extenders/antiblocking agents/detackifying agents include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. The amount of filler/extender/antiblocking agent/detackifying agent in the water-soluble film may be in a range of about 0.1 wt % to about 25 wt %, or about 1 wt % to about 10 wt %, or about 2 wt. % to about 8 wt. %, or about 3 wt. % to about 5 wt. %. In the absence of starch, one preferred range for a suitable filler/extender/antiblocking agent/detackifying agent is about 0.1 wt % or 1 wt % to about 4 wt % or 6 wt %, or about 1 wt. % to about 4 wt. %, or about 1 wt. % to about 2.5 wt. %.

The water-soluble film can further have a residual moisture content of at least 4 wt. %, preferably in a range of about 4 to about 10 wt. %, as measured by Karl Fischer titration.

The film may be opaque, transparent or translucent. The film may comprise a printed area. The area of print may cover an uninterrupted portion of the film or it may cover parts thereof. The area of print may comprise inks, pigments, dyes, blueing agents or mixtures thereof. The area of print may comprise a single color or maybe comprise multiple colors, even three colors. The print may be present as a layer on the surface of the film or may at least partially penetrate into the film. The film will comprise a first side and a second side. The area of print may be achieved using standard techniques, such as flexographic printing or inkjet printing. The area of print may be on either or both sides of the film. Alternatively, an ink or pigment may be added during the manufacture of the film such that all or at least part of the film is colored.

Other features of water-soluble polymer compositions such as films, may be found in U.S. Publication No. 2011/0189413 and U.S. application Ser. No. 13/740,053, both of which are incorporated by reference herein in their entireties.

Method of Making Film

One contemplated class of embodiments is characterized by the water-soluble film being formed by, for example, admixing, co-casting, or welding the PVOH polymer (or PVOH polymers in the case of a blend system) together with the eutectic solvents along with any optional secondary additives described herein. if the polymers are first admixed then the water-soluble film is preferably formed by casting the resulting admixture (e.g., along with other plasticizers and other additives) to form a film. If the polymers are welded, the water-soluble film can be formed by, for example, solvent or thermal welding. Another contemplated class of embodiments is characterized by the water-soluble film being formed by extrusion, for example, blown extrusion. In one contemplated non-limiting embodiment a PVOH polymer and an acrylamido methylpropanesulfonic acid PVOH terpolymer blended film is formed by blown extrusion.

The water-soluble film may be formed by, for example, admixing, co-casting, or welding the first PVOH copolymer and the second PVOH polymer according to the types and amounts described herein, together with the preferred and optional secondary additives described herein. If the polymers are first admixed then the water-soluble film is preferably formed by casting the resulting admixture (e.g., along with other plasticizers and other additives) to form a film. If the polymers are welded, the water-soluble film can be formed by, for example, solvent or thermal welding. The water-soluble film may be formed by extrusion, for example, blown extrusion.

The film can have any suitable thickness. For example, the film can have a thickness in a range of about 5 to about 200 μm, or in a range of about 20 to about 100 μm, or about 40 to about 85 μm, for example 76 μm. When a pouch is made, for example through thermoforming as described below, the film may be deformed, resulting in varying film thicknesses in a pouch. Therefore, an undeformed thickness of the film may be determined prior to deformation and/or pouch formation.

The water-soluble film may also be a free-standing film consisting of one layer or a plurality of like layers.

The film described herein can also be used to make an article such as a packet with two or more compartments made of the same film or in combination with films of other polymeric materials. Additional films can, for example, be obtained by casting, blow-molding, extrusion or blown extrusion of the same or a different polymeric material, as known in the art. The polymers, copolymers or derivatives thereof suitable for use as the additional film may be selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. One contemplated class of films is characterized by the level of polymer in the pouch material, for example the PVOH resin blend, as described above, being at least 60%.

The weight ratio of the amount of all water-soluble polymers as compared to the combined amount of all plasticizers, compatibilizing agents, and secondary additives can be in a range of from about 0.5 to about 18, about 0.5 to about 15, about 0.5 to about 9, about 0.5 to about 5, about 1 to 3, or about 1 to 2, for example. Preferably this ratio is from about 1 to about 3, more preferably from about 1.3 to about 2.5. The specific amounts of plasticizers and other non-polymer component can be selected in a particular embodiment based on an intended application of the water-soluble film to adjust film flexibility and to impart processing benefits in view of desired mechanical film properties.

Pouches

The film may be formed into a pouch having one or more compartments, which may at least partially or completely enclose a composition. The composition may be a household care composition at least partially enclosed in a compartment by the water-soluble film. Suitable films and household care compositions are described in more detail herein.

The pouches typically include at least one sealed compartment. The pouches may comprise a single compartment or multiple compartments, such as at least two compartments or at least three compartments. FIG. 1 illustrates an article in which a water-soluble pouch 100 is formed from water-soluble polymer films 10, 20 sealed at an interface 30. One or both of the films 10, 20 include the PVOH resin blend of the first PVOH polymer and the second PVOH polymer. The films 10, 20 define an interior pouch container volume 40 which contains any desired composition 50 for release into an aqueous environment. The composition 50 is not particularly limited, for example including any of the variety of compositions described below. In embodiments comprising multiple compartments, each compartment may contain identical and/or different compositions. In turn, the compositions may take any suitable form including, but not limited to liquid, solid and combinations thereof (e.g. a solid suspended in a liquid). The pouches may comprise a first, second and third compartment, each of which respectively contains a different first, second, and third composition.

The compartments of multi-compartment pouches may be of the same or different size(s) and/or volume(s). The compartments of the present multi-compartment pouches can be separate or conjoined in any suitable manner. The second and/or third and/or subsequent compartments may be superimposed on the first compartment. The third compartment may be superimposed on the second compartment, which may in turn be superimposed on the first compartment in a sandwich configuration. Alternatively the second and third compartments may be superimposed on the first compartment. However, it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, for example, so as to pre-treat or post-treat a fabric with a composition from a compartment. The first compartment may be surrounded by at least the second compartment, for example in a tire-and-rim configuration, or in a pouch-in-a-pouch configuration.

Multi-compartment pouches may comprise three compartments consisting of a large first compartment and two smaller compartments. The second and third smaller compartments are superimposed on the first larger compartment. The size and geometry of the compartments are chosen such that this arrangement is achievable. The geometry of the compartments may be the same or different. The second and optionally third compartment may each have a different geometry and shape as compared to the first compartment. The second and optionally third compartments may be arranged in a design on the first compartment. The design may be decorative, educative, or illustrative, for example to illustrate a concept or instruction, and/or used to indicate origin of the product. The first compartment may be the largest compartment having two large faces sealed around the perimeter, and the second compartment is smaller covering less than about 75%, or less than about 50% of the surface area of one face of the first compartment. When there is a third compartment, the aforementioned structure may be the same but the second and third compartments cover less than about 60%, or less than about 50%, or less than about 45% of the surface area of one face of the first compartment.

The articles, pouches, and/or packets of the present disclosure may comprise one or more different films. For example, when the pouch includes a single compartment, the pouch may be made from one wall that is folded onto itself and sealed at the edges, or alternatively, two walls that are sealed together at the edges. When the pouch includes multiple compartments, the pouch may be made from one or more films such that any given packet compartment may comprise walls made from a single film or multiple films having differing compositions. A multi-compartment pouch may comprise at least three walls: an outer upper wall; an outer lower wall; and a partitioning wall. The outer upper wall and the outer lower wall are generally opposing and form the exterior of the pouch. The partitioning wall is interior to the pouch and is secured to the generally opposing outer walls along a seal line. The partitioning wall separates the interior of the multi-compartment pouch into at least a first compartment and a second compartment.

Articles such as pouches and packets may be made using any suitable equipment and method. For example, single compartment pouches may be made using vertical form filling, horizontal form filling, or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds, in which articles such as packets may be made, can have any shape, length, width and depth, depending on the required dimensions of the pouches. The molds may also vary in size and shape from one to another, if desirable. For example, the volume of the final pouches may be about 5 ml to about 300 ml, or about 10 to 150 ml, or about 20 to about 100 ml, and the mold sizes are adjusted accordingly.

The pouch may comprise a first and a second sealed compartment. The second compartment may be in a generally superposed relationship with the first sealed compartment such that the second sealed compartment and the first sealed compartment share a partitioning wall interior to the pouch.

The pouch may comprise a first and a second compartment further comprises a third sealed compartment. The third sealed compartment is in a generally superposed relationship with the first sealed compartment such that the third sealed compartment and the first sealed compartment share a partitioning wall interior to the pouch.

The first composition and the second composition may be selected from one of the following combinations: liquid, liquid; liquid, powder; powder, powder; and powder, liquid. The first, second and third compositions may be selected from one of the following combinations: solid, liquid, liquid; and liquid, liquid, liquid; liquid, solid, liquid; solid, liquid, solid; and solid, solid, solid.

The single compartment or plurality of sealed compartments may contain a composition. The plurality of compartments may each contain the same or a different composition. The composition may be in a form selected from a liquid, solid, or combination thereof. The composition may be in the form of a liquid, solid, a powder, beads, or mixtures thereof.

The composition may be a household care composition, for example a household care composition selected from the group of light duty liquid detergents compositions, heavy duty liquid detergent compositions, hard surface compositions including hand dishwashing or automatic dishwashing compositions, detergent gels commonly used for laundry, bleaching compositions, laundry additives, fabric enhancer compositions, shampoos, body washes, other personal care compositions, and mixtures thereof.

Pouches may be made according to any suitable method. For example, the method may include the steps of: providing a water-soluble film as described herein; shaping the film to form an open compartment; providing the composition to the open compartment; and sealing the open compartment, e.g., with a second water soluble film, to form a pouch having a sealed compartment having the composition enclosed therein.

The different compartments of a multi-compartment pouches may be made together in a side-by-side style wherein the resulting, cojoined pouches may or may not be separated by cutting. Alternatively, the compartments can be made separately.

Pouches may be made according to a process comprising the steps of: a) forming a first compartment (as described above); b) forming a recess within some or all of the closed compartment formed in step (a), to generate a second molded compartment superposed above the first compartment; c) filling and closing the second compartments by means of a third film; d) sealing the first, second and third films; and e) cutting the films to produce a multi-compartment pouch. The recess formed in step (b) may be achieved by applying a vacuum to the compartment prepared in step (a).

Second and/or third compartment(s) can be made in a separate step and then combined with the first compartment as described in European Patent Application Number 08101442.5 or WO 2009/152031.

Pouches may be made according to a process comprising the steps of: a) forming a first compartment, optionally using heat and/or vacuum, using a first film on a first forming machine; b) filling the first compartment with a first composition; c) on a second forming machine, deforming a second film, optionally using heat and vacuum, to make a second and optionally third molded compartment; d) filling the second and optionally third compartments; e) sealing the second and optionally third compartment using a third film; f) placing the sealed second and optionally third compartments onto the first compartment; g) sealing the first, second and optionally third compartments; and h) cutting the films to produce a multi-compartment pouch.

The first and second forming machines may be selected based on their suitability to perform the above process. The first forming machine may be a horizontal forming machine, and the second forming machine may be a rotary drum forming machine, for example located above the first forming machine.

It should be understood that by the use of appropriate feed stations, it may be possible to manufacture multi-compartment pouches incorporating a number of different or distinctive compositions and/or different or distinctive liquid, gel or paste compositions.

The film and/or pouch may be sprayed or dusted with a suitable material, such as an active agent, a lubricant, an aversive agent, or mixtures thereof. The film and/or pouch may be printed upon, for example, with an ink and/or an active agent.

The compositions encapsulated by the films described herein can have any suitable viscosity depending on factors such as formulated ingredients and purpose of the composition. The composition may have a high shear viscosity value, at a shear rate of 20 $s^{-1}$ and a temperature of 20° C., of 100 to 3,000 cP, alternatively 300 to 2,000 cP, alternatively 500 to 1,000 cP, and a low shear viscosity value, at a shear rate of 1 $s^{-1}$ and a temperature of 20° C., of 500 to 100,000 cP, alternatively 1000 to 10,000 cP, alternatively 1,300 to 5,000 cP. Methods to measure viscosity are known in the art. According to the present disclosure, viscosity measurements are carried out using a rotational rheometer e.g. TA instruments AR550. The instrument includes a 40 mm 2° or 1° cone fixture with a gap of around 50-60 µm for isotropic liquids, or a 40 mm flat steel plate with a gap of 1000 µm for particles containing liquids. The measurement is carried out using a flow procedure that contains a conditioning step, a peak hold and a continuous ramp step. The conditioning step involves the setting of the measurement temperature at 20° C., a pre-shear of 10 seconds at a shear rate of 10 $s^{-1}$, and an equilibration of 60 seconds at the selected temperature. The peak hold involves applying a shear rate of 0.05 $s^{-1}$ at 20° C. for 3 min with sampling every 10 s. The continuous ramp step is performed at a shear rate from 0.1 to 1200 $s^{-1}$ for 3 min at 20° C. to obtain the full flow profile.

The compositions of the present disclosure when in a pouch form may comprise components as described in more detail below.

Perfume

The perfume may comprise neat perfume, encapsulated perfume, or mixtures thereof. Preferably, the perfume comprises neat perfume. A portion of the perfume may be encapsulated in a core-shell encapsulate.

As used herein, the term "perfume" encompasses the perfume raw materials (PRMs) and perfume accords. The term "perfume raw material" as used herein refers to compounds having a molecular weight of at least about 100 g/mol and which are useful in imparting an odor, fragrance, essence or scent, either alone or with other perfume raw materials. As used herein, the terms "perfume ingredient" and "perfume raw material" are interchangeable. The term "accord" as used herein refers to a mixture of two or more PRMs.

A portion of the perfume may be encapsulated perfume. The perfume may be encapsulated in a core-shell encapsulate. An encapsulate may include a core and a wall, where the wall acts as a shell at least partially surrounding the core. The core may include a benefit agent, such as perfume. The wall may include an outer surface, which may include a coating. The coating may include an efficiency polymer. These elements are discussed in more detail below.

The encapsulate may have a wall, which may at least partially surround the core. The wall may include a wall material selected from the group consisting of polyethylenes; polyamides; polystyrenes; polyisoprenes; polycarbonates; polyesters; polyacrylates; acrylics; aminoplasts; polyolefins; polysaccharides, such as alginate and/or chitosan; gelatin; shellac; epoxy resins; vinyl polymers; water insoluble inorganics; silicone; and mixtures thereof. The wall material may be selected from the group consisting of an aminoplast, an acrylic, an acrylate, and mixtures thereof.

The outer wall of the encapsulate may include a coating. Certain coatings may improve deposition of the encapsulate onto a target surface, such as a fabric. The encapsulate may have a coating-to-wall weight ratio of from about 1:200 to about 1:2, or from about 1:100 to about 1:4, or even from about 1:80 to about 1:10.

The coating may comprise an efficiency polymer. The coating may comprise a cationic efficiency polymer. The cationic polymer may be selected from the group consisting of polysaccharides, cationically modified starch, cationically modified guar, polysiloxanes, poly diallyl dimethyl ammonium halides, copolymers of poly diallyl dimethyl ammonium chloride and vinyl pyrrolidone, acrylamides, imidazoles, imidazolinium halides, imidazolium halides, polyvinyl amines, polyvinyl formamides, pollyallyl amines, copolymers thereof, and mixtures thereof. The coating may comprise a polymer selected from the group consisting of polyvinyl amines, polyvinyl formamides, polyallyl amines, copolymers thereof, and mixtures thereof.

The core of the encapsulate may include a benefit agent. Suitable benefit agents may include perfume raw materials, silicone oils, waxes, hydrocarbons, higher fatty acids, essential oils, lipids, skin coolants, vitamins, sunscreens, antioxidants, glycerine, catalysts, bleach particles, silicon dioxide particles, malodor reducing agents, odor-controlling materials, chelating agents, antistatic agents, softening agents, insect and moth repelling agents, colorants, antioxidants, chelants, bodying agents, drape and form control agents, smoothness agents, wrinkle control agents, sanitization agents, disinfecting agents, germ control agents, mold control agents, mildew control agents, antiviral agents, drying agents, stain resistance agents, soil release agents, fabric refreshing agents and freshness extending agents, chlorine bleach odor control agents, dye fixatives, dye transfer inhibitors, color maintenance agents, optical brighteners, color restoration/rejuvenation agents, anti-fading agents, whiteness enhancers, anti-abrasion agents, wear resistance agents, fabric integrity agents, anti-wear agents, anti-pilling agents, defoamers, anti-foaming agents, UV protection agents, sun fade inhibitors, anti-allergenic agents, enzymes, water proofing agents, fabric comfort agents, shrinkage resistance agents, stretch resistance agents, stretch recovery agents, skin care agents, glycerin, and natural actives, antibacterial actives, antiperspirant actives, cationic polymers, dyes and mixtures thereof. The benefit agent may include perfume raw materials.

The encapsulates may include a core that comprises perfume raw materials, and a wall that includes melamine formaldehyde and/or cross linked melamine formaldehyde, where the wall further comprises a coating on an outer surface of the wall, where the coating includes an efficiency polymer such as polyvinyl formamide.

Organic Solvent

Organic solvents may be useful in the pouch compositions of the present disclosure, for example, to facilitate product stability. However, the loss of organic solvents from the pouches described herein can cause problems such as product instability, sticky or greasy pouches, etc. It is believed that the water-soluble films of the present disclosure operate with the compositions and containers of the present disclosure to minimize the loss of organic solvents while providing other pouch benefits, such as pouch integrity, film plasticity, in-use dissolution, and/or perfume release.

Other Ingredients

The pouch compositions described herein may comprise one or more of the following non-limiting list of ingredients: fabric care benefit agent; detersive enzyme; deposition aid; rheology modifier; builder; bleach; bleaching agent; bleach precursor; bleach booster; bleach catalyst; perfume loaded zeolite; starch encapsulated accord; polyglycerol esters; whitening agent; pearlescent agent; enzyme stabilizing systems; scavenging agents including fixing agents for anionic dyes, complexing agents for anionic surfactants, and mixtures thereof; optical brighteners or fluorescers; polymer including but not limited to soil release polymer and/or soil suspension polymer; dispersants; antifoam agents; non-aqueous solvent; fatty acid; suds suppressors, e.g., silicone suds suppressors; cationic starches; scum dispersants; substantive dyes; hueing dyes; colorants; opacifier; antioxidant; hydrotropes such as toluenesulfonates, cumenesulfonates and naphthalenesulfonates; color speckles; colored beads, spheres or extrudates; clay softening agents; anti-bacterial agents. Additionally or alternatively, the compositions may comprise surfactants, quaternary ammonium compounds, and/or solvent systems. Quaternary ammonium compounds may be present in fabric enhancer compositions, such as fabric softeners, and comprise quaternary ammonium cations that are positively charged polyatomic ions of the structure $NR_4^+$, where R is an alkyl group or an aryl group.

Methods of Use

The container systems described herein may be suitable for storing, transporting, and/or selling the pouches contained therein.

Any of the pouches described herein, as well as the household compositions contained therein, may be used to treat a substrate, e.g., fabric or a hard surface, for example by contacting the substrate with the film, article, and/or composition contained therein. The contacting step may occur manually or in an automatic machine, e.g., an automatic (top or front-loading) laundry machine or an automatic dishwashing machine. The contacting step may occur in the presence of water, which may be at a temperature up to about 80° C., or up to about 60° C., or up to about 40° C., or up to about 30° C., or up to about 20° C., or up to about 15° C., or up to about 10° C., or up to about 5° C. The contacting step may be followed by a multi-rinse cycle or even by a single rinse cycle. The method may include a step of opening a closed container and accessing a pouch contained therein. The method may further include the step of closing the container.

The present disclosure further relates to a use of a water-soluble film to provide a pleasant scent experience upon opening a container, where the water-soluble film forms a pouch and at least partially encloses in a compartment a household care composition that comprises perfume and organic solvent, and where the water-soluble film comprises a polyvinyl alcohol (PVOH) resin blend, the PVOH resin blend comprising a first PVOH polymer that comprises a first anionic monomeric unit, a vinyl alcohol monomer unit, and optionally a vinyl acetate unit, the PVOH resin blend further comprising a second PVOH polymer selected from the group consisting of: a) a PVOH polymer that comprises a second anionic monomeric unit, a vinyl alcohol monomer unit, and optionally a vinyl acetate unit, or b) a PVOH homopolymer consisting essentially of a vinyl alcohol monomer unit and optionally a vinyl acetate unit.

EXAMPLES

The effect of eutectic type and amount on reducing the melting temperature of PVOH is studied by preparing compositions of PVOH with varying amounts of eutectic solvents. Compositions of PVOH polymer and the traditional plasticizer propylene glycol are also made as control. Compositions are prepared via solution casting of films by dissolving specific ratios of PVOH polymer and eutectic solvent components in water and drying into films to remove the excess water. Table 2 illustrates the melting temperature reduction for compositions prepared using SELVOL™ POLYVINYL ALCOHOL 205 sold by Sekisui Specialty Chemicals LLC, Dallas, TX. It has a hydrolysis of 88 mol. %, a 4 wt. % solution viscosity of 5.7 cPs, a weight average molecular weight of approximately 50,000 g/mol, and a reported melting temperature from about 180° C. to about 190° C.

TABLE 2

Melting temperature of PVOH compositions containing different amounts of traditional plasticizer and eutectic solvents as measured by DSC

| | | Traditional Plasticizer | Eutectic Solvent Plasticizers (molar ratio) | | | |
|---|---|---|---|---|---|---|
| | | | 1:1 malic acid: | 1:3 malic acid: | 1:2 maleic acid: | 1:1 lactic acid: |
| Wt. % PVOH* | wt. % additive | Propylene glycol | choline chloride | choline chloride | choline chloride | betaine |
| 95% | 5% | 160 | 146 | 143 | 143 | 150 |
| 90% | 10% | 160 | 135 | 130 | 131 | 140 |
| 85% | 15% | 159 | 127 | 115** | 124 | 132 |
| 80% | 20% | 142 | 122 | 107** | 114 | 128 |

*PVOH is SELVOL ™ POLYVINYL ALCOHOL 205
**Films formed from these compositions were observed to be less mechanically robust than other films in the data set.

Table 3 illustrates the melting temperature of compositions prepared using a blend of PVOH polymers where the PVOH blend is 50 wt. % of PVOH with a MW of 85-125K and a degree of hydrolysis of 87 to 89 mole % and 50 wt. % of PVOH with a MW of 145-185K and a degree of hydrolysis of 87 to 89 mole %.

TABLE 3

Melting temperature of PVOH compositions containing different amounts of traditional plasticizer and eutectic solvents as measured by DSC

| | | Traditional Plasticizers | Eutectic Solvent Plasticizers (molar ratio) | | | |
|---|---|---|---|---|---|---|
| | | | 1:2 malic acid: | 1:2 maleic acid: | 1:1 lactic | 1:1:2 malic acid: |
| wt. % PVOH | wt. % plasticizer | Propylene glycol | choline chloride | choline chloride | acid: betaine | choline chloride: water |
| 95% | 5% | 169 | 142.8 | 161.6 | 132.6 | 142.8 |
| 90% | 10% | 169 | —* | 155.4 | 127.7 | 139.9 |
| 85% | 15% | 170 | 129.2 | 134.7 | 124.1 | 130.6 |
| 80% | 20% | —* | —* | 125.6 | 122.8 | 130.9 |

*Indicates sample was not prepared.

The melting temperature of compositions containing PVOH polymers are unaffected by propylene glycol level between five weight percent and 15 weight percent. The melting temperature of compositions containing different types of eutectic solvents reduce the melting temperature of the composition relative to PVOH alone and the PVOH/propylene glycol control.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble composition comprising:
   a polyvinyl alcohol (PVOH) polymer;
   a eutectic solvent.

2. The water-soluble film composition of claim 1 wherein the eutectic solvent comprises a hydrogen bond donor (HBD) and a hydrogen bond acceptor (HBA).

3. The water-soluble film composition of claim 2 wherein the HBD to HBA are present at a molar ratio of from about 1:1 to about 1:3.

4. The water-soluble film composition of claim 2 wherein the HBD is at least one of carboxylic acid that does not contain a quaternary amine moiety, sugars, sugar alcohols, or amides.

5. The water-soluble film composition of claim 1 wherein the HBA is at least one of amino acids, polyols that are not sugar alcohols, and amines.

6. The composition of claim 1 wherein the composition has a melting temperature of less than 170 C.

7. The composition of claim 1 wherein the composition comprises from about 1% to about 20% by weight of the eutectic solvent.

8. The composition of claim 1 wherein the composition further comprises from about 0.01% to about 20% of a benefit agent.

9. The composition of claim 8 wherein the benefit agent is at least one of an perfumes, pro-perfumes, finishing aids, malodor control and removal agents, odor neutralizers, polymeric dye transfer inhibiting agents, cationic deposition enhancing polymers, builders, heavy metal ion sequestrants, surfactants, suds stabilizing polymers, pH modifiers, buffering agents, alkalinity sources, fabric softeners, antistatic agents, dye fixatives, dye abrasion inhibitors, wrinkle reduction agents, wrinkle resistance agents, wrinkle release agents, silicones, soil release polymers, soil capture polymers, flocculating polymers, soil repellency agents, colorants, pigments, adversive agents such as bittering agents, anti-redeposition agents, bleach activators, bleach catalysts, bleach boosters, bleaches, photobleaches, enzymes, coenzymes, enzyme stabilizers, crystal growth inhibitors, anti-tarnishing agents, anti-oxidants, metal ion salts, corrosion inhibitors, antiperspirant, zinc pyrithione, plant derivatives, plant extracts, plant tissue extracts, plant seed extracts, plant oils, botanicals, botanical extracts, essential oils, skin sensates, astringents, anti-acne agents, anti-dandruff agents, antifoaming agents, cosmetic astringents, cosmetic biocides, denaturants, drug astringents, external analgesics, film formers or materials for aiding the film-forming properties and substantivity of the composition, skin bleaching and lightening agents, skin-conditioning agents, skin soothing and/or healing agents and derivatives, skin treating agents, sunscreen agents, insect repellants, oral care actives, personal health care actives, vitamins, anti-bacterial agents, antimicrobial agents, antifungal agents, their derivatives, and mixtures thereof.

10. The composition of claim 8, wherein the benefit agent is temperature sensitive.

11. A method of melt flow processing a composition according to claim 1 wherein the method is selected form the group consisting of injection molding, blow molding, filament extrusion and, optionally, pelletization, film extrusion, melt spinning of fibers and/or nonwoven substrates, 3D printing, rotoforming, and prilling.

12. A method of manufacturing a 3D article comprising the steps of:
    heating a composition according to claim 1 to a temperature of about 80° C. to about 170° C.;
    applying pressure to the composition causing it to flow.

13. A method of making a water-soluble film comprising:
    providing a polyvinyl alcohol (PVOH) polymer;
    providing a eutectic solvent;
    forming a water-soluble film comprising the eutectic solvent and PVOH polymer.

* * * * *